United States Patent
Fukuda et al.

(10) Patent No.: US 6,662,893 B2
(45) Date of Patent: Dec. 16, 2003

(54) FORWARD AND AFT TORQUE DISTRIBUTION CONTROL SYSTEM FOR 4WD VEHICLE AND METHOD

(75) Inventors: Yoshiyuki Fukuda, Kanagawa-ken (JP); Norio Iida, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 38 days.

(21) Appl. No.: 09/933,160

(22) Filed: Aug. 21, 2001

(65) Prior Publication Data

US 2002/0033293 A1 Mar. 21, 2002

(30) Foreign Application Priority Data

Sep. 19, 2000 (JP) ........................................ 2000-282897

(51) Int. Cl.$^7$ .............................................. B60K 17/35
(52) U.S. Cl. ........................................ 180/249; 180/248
(58) Field of Search ................................ 180/248, 249; 701/89

(56) References Cited

U.S. PATENT DOCUMENTS

| | | | | |
|---|---|---|---|---|
| 5,839,084 A | * | 11/1998 | Takasaki | ..................... 180/233 |
| 5,954,150 A | * | 9/1999 | Miller | ......................... 180/248 |
| 6,105,702 A | * | 8/2000 | Showalter | ................... 180/249 |
| 6,189,642 B1 | * | 2/2001 | Kusano | ....................... 180/249 |
| 6,497,301 B2 | * | 12/2002 | Iida | ............................ 180/249 |

FOREIGN PATENT DOCUMENTS

JP          63-170129          7/1988

* cited by examiner

Primary Examiner—Daniel G. DePumpo
(74) Attorney, Agent, or Firm—Foley & Lardner (57) ABSTRACT

A forward and aft torque distribution system and a method of controlling forward and aft torque distribution for a four-wheel vehicle having an electronically controlled clutch to control split of drive torque to be transferred to front and rear wheels are disclosed. A 4WD controller is responsive to mode selection signals from a mode changeover switch and a vehicle speed signal delivered from a vehicle speed sensor, and has control modes involving at least a LOCK mode and an AUTO mode. When the vehicle speed becomes less than a vehicle's halt discriminative vehicle speed indicative of a vehicle's halt state during the LOCK mode, the controller allows the electronically controlled clutch to be released.

9 Claims, 8 Drawing Sheets

PUSHED FORWARD AT LOCK MODE  RETRACTED REARWARD AT LOCK MODE

FIG.4

FIG.5A
(BEFORE CONTROL)

FIG.5B
(AFTER CONTROL)

FIG.6A
(BEFORE CONTROL)

FIG.6B
(AFTER CONTROL)

FIG.7A
(BEFORE CONTROL)

FIG.7B
(AFTER CONTROL)

FIG.8A
(BEFORE CONTROL)

FIG.8B
(AFTER CONTROL)

FIG.9

FORWARD AND AFT TORQUE DISTRIBUTION CONTROL SYSTEM FOR 4WD VEHICLE AND METHOD

BACKGROUND OF THE INVENTION

The present invention relates to a torque split control system for 4WD vehicles and method, and more particularly, to a forward and aft torque distribution control system for variably controlling torque distribution to be split to front and rear wheels of a four-wheel drive vehicle by controlling coupling torque of an electronically controlled clutch and a method of controlling forward and aft torque distribution for the four-wheel drive vehicle.

Considerable research and development work has been undertaken in the related art to suitably control forward and aft torque distribution of a four-wheel drive (hereinafter referred to as 4WD) vehicle. An attractive approach to the suitable control of the torque distribution uses a manual mode changeover switch adapted to produce mode selection signals, a controller responsive to the mode selection signals, and an electronically controlled clutch controlled by the controller so as to control torque distribution at a variable torque split ratio to be split to front and rear wheels of the vehicle. The mode changeover switch produces a 2WD (two-wheel drive) mode signal (a clutch uncoupling mode signal), a LOCK mode signal (a clutch torque locking signal) and an AUTO mode signal (an automatic clutch torque regulating signal), which are manually selected. Such a 4WD vehicle is for example disclosed in Japanese Patent Application Laid-Open Publication No. S63-170129.

Such an electronically controlled clutch is constructed of a clutch of the type which is actuated by hydraulic pressure that is electronically controlled and which has multiple clutch plates adapted to be coupled with hydraulic pressure. With the use of working oil as working medium to produce coupling torque, the 4WD vehicle is not subjected to undesired noisy sounds that would otherwise occur in a four-wheel (4W) drive unit owing to clutch coupling and twisting motions of a drive shaft and propeller shaft during running of the vehicle in forward or rearward directions under a circumstance in that the vehicle is fully steered rightward or leftward.

SUMMARY OF THE INVENTION

However, in the electronic controlled clutch of the type wherein the multiple clutch plates are directly urged without the use of working medium which produces hydraulic pressure, coupling torque is obtained with the clutch through a mechanical actuating cam mechanism. With such an actuating cam mechanism, the 4W drive unit comes into a situation where torque through the electronically controlled clutch is not smoothly distributed to wheels, that is, the 4W drive unit becomes internally replete with the torque in the electronically controlled clutch (hereinafter simply referred as replete) during running mode of the vehicle in the forward or rearward directions under the condition in that the vehicle is fully steered rightward or leftward. This leads to noisy sounds produced in the 4W drive unit.

That is, when the LOCK mode is selected and engine drive torque is split over to the front and rear wheels on the basis of torque distribution ratio 50:50, steering the vehicle at a slow speed and at a full extent during running in the forward direction (or in the rearward direction) at the LOCK mode essentially increases the magnitude of torque to be replete in the 4W drive unit owing to twisting motions of the drive shaft and the propeller shaft. Under such a condition, if the vehicle is shifted in the rearward direction (or in the forward direction), the twisting motion tends to be rapidly returned with a resultant noisy sound.

In particular, when the LOCK mode is selected, the actuating cam mechanism of the electronically controlled clutch operates as follows. That is, as shown by the arrows in FIG. 3, when the LOCK mode is selected, a control cam is retracted rearward of the vehicle at the LOCK mode and a main cam is pushed forward of the vehicle at the LOCK mode, with balls losing binding power between separated opposing cam recesses such that the balls are located in an outermost area in a radial direction due to centrifugal force. Subsequently, when the twisting motion is rapidly returned, the balls, which remains in an unstable state without binding power, is apt to strike against the opposing cam recesses which tend to close, with a resultant knocking sound to produce the undesired noisy sound in the 4W drive unit.

One technology for addressing these issues is to uncouple the electronically controlled clutch by considering the halt condition of the vehicle to release coupling torque thereof until the vehicle comes to a halt state during the forward running state and is shifted to the rearward running state for thereby preventing the 4W drive unit from being replete with torque.

However, the 4W drive unit still suffers from the noisy sound unless coupling torque is released until the vehicle is shifted from the halt condition in the forward running state (or in the rearward running state) to the rearward running state (or the rearward running state).

The present invention has been made to address these issues and has an object of the present invention to provide a forward and aft torque distribution system for a 4WD vehicle which ensures a performance of a controller at a LOCK mode while avoiding a noisy sound from being produced in a drive unit when the LOCK mode is selected.

It is another object of the present invention to provide a method of controlling forward and aft torque distribution in a 4WD vehicle so as to overcome various problems encountered in the related art practices.

According to one aspect of the present invention, there is provided a forward and aft torque distribution control system for a four-wheel drive vehicle. The system comprises an electronically controlled clutch to control forward and aft torque distribution to be transferred to front and rear wheels, a mode changeover switch selectively producing mode selection signals involving at least a LOCK mode selection signal and an AUTO mode selection signal, a vehicle speed sensor detecting a vehicle speed and producing a vehicle speed signal, and a controller responsive to the mode selection signals and the vehicle speed signal and controlling an electronically controlled clutch to control forward and aft torque distribution to be split to front and rear wheels. The controller has control modes involving at least a LOCK mode to allow the electronically controlled clutch to be locked in a coupled state, and an AUTO mode to allow the electronically controlled clutch to be automatically controlled so as to alter forward and aft torque distribution in dependence on running conditions of a four-wheel drive vehicle. When the vehicle speed becomes less than a vehicle's halt discriminating vehicle speed indicative of a vehicle's halt state during the LOCK mode, the controller allows the electronically controlled clutch to be released. Please note that halt "discriminative" vehicle speed is used interchangeably herein with halt "discriminating" vehicle speed.

In other words, a forward and aft torque distribution control system for a four-wheel drive vehicle comprises an electronically controlled clutch controlling forward and aft torque distribution to be transferred to front and rear wheels, mode changeover means for selectively producing at least a LOCK mode selection signal and an AUTO mode selection signal, vehicle speed sensing means for detecting a vehicle speed and producing a vehicle speed signal, and 4WD control means for controlling an electronically controlled clutch to control forward and aft torque distribution to be split to front and rear wheels, responsive to the mode selection signals and the vehicle speed signal. The 4WD control means has control modes involving at least a LOCK mode to allow the electronically controlled clutch to be locked in a coupled state, and an AUTO mode to allow the electronically controlled clutch to be automatically controlled so as to alter forward and aft torque distribution in dependence on running conditions of a four-wheel drive vehicle. When the vehicle speed becomes less than a vehicle's halt discriminating vehicle speed indicative of a vehicle's halt state during the LOCK mode, the 4WD control means allows the electronically controlled clutch to be released.

Besides, a method of controlling forward and aft torque distribution control for a four-wheel drive vehicle of one aspect of the present invention prepares an electronically controlled clutch to control drive torque to be transferred to front and rear wheels, prepares a controller having control modes involving at least a LOCK mode to allow an electronically controlled clutch to be locked in a coupled state and an AUTO mode to allow the electronically controlled clutch to be automatically controlled so as to alter forward and aft torque distribution in dependence on running conditions of a four-wheel drive vehicle, selectively produces mode selection signals involving at least a LOCK mode selection signal and an AUTO mode selection signal, detects a vehicle speed and producing a vehicle speed signal, and controls the electronically controlled clutch with the controller to control forward and aft torque distribution to be split to front and rear wheels in response to the mode selection signals and the vehicle speed signal such that when the vehicle speed becomes less than a vehicle's halt discriminating vehicle speed indicative of a vehicle's halt state during the LOCK mode, the controller allows the electronically controlled clutch to be released.

Other and further features, advantages, and benefits of the present invention will become more apparent from the following description taken in conjunction with the following drawings.

DETAILED DESCRIPTION OF THE EMBODIMENTS

To describe the present invention more in detail, preferred embodiments of the present invention will be explained with reference to the drawings below.

An Embodiment

Figure 1:
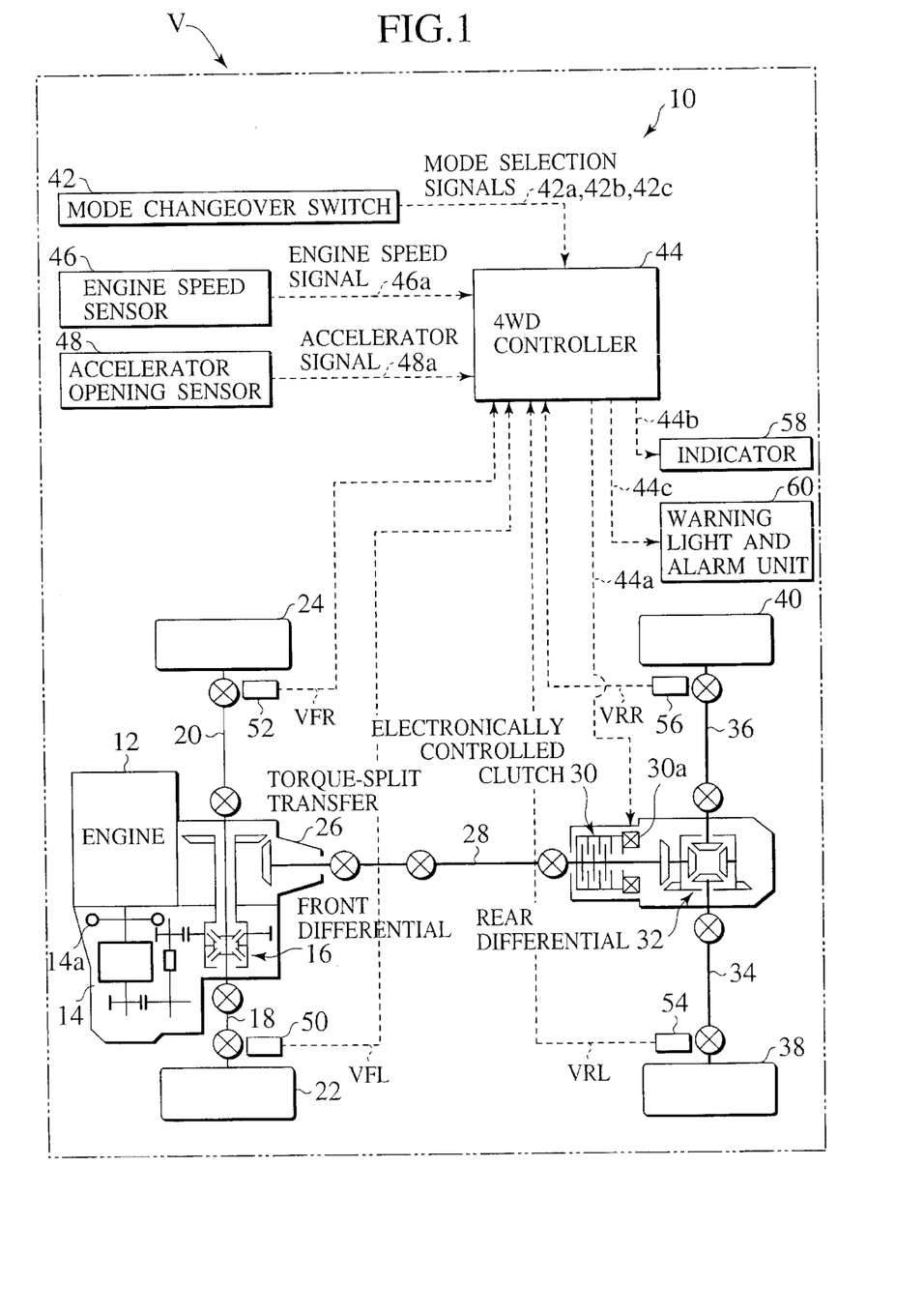
FIG. 1 is a system diagram of an embodiment of a forward and aft torque distribution system for a 4WD vehicle according to the present invention.

FIG. 1 is a block diagram of an embodiment of a forward and aft torque distribution system for front and rear wheels of a 4WD vehicle V according to the present invention.

The forward and aft torque distribution system 10 includes an engine 12, an automatic power transmission 14 coupled to the engine 12 through a torque converter 14a, a front differential 16 coupled to the transmission 14, front drive shafts 18,20 coupled to the front differential 16, left and right front wheels 22,24, a torque split transfer 26 coupled to the front differential 16, a propeller shaft 28 extending from the front differential 16, an electronically controlled clutch 30 connected to a rear distal end of the propeller shaft 28, a rear differential 32 coupled to the electronically controlled clutch 30, rear drive shafts 34,36 coupled to the rear differential 32, and left and right rear wheels 38,40.

In particular, the 4WD vehicle to which the forward and aft torque distribution system 10 is applied is based on a F-F vehicle (i.e., a front engine and front drive vehicle) wherein drive torque produced by the engine 12 is delivered through the transmission 14 to the front wheels 22,24 and a part of drive torque is split and transmitted through the electronically controlled clutch 30 to the rear wheels 38,40. In such a torque split path, during an un-coupling state (releasing state) of the electronically controlled clutch 30, a drive torque split ratio (%) is preset to a forward and aft torque distribution ratio as expressed by the front wheel: the rear wheel=100:0 (%).

During a fully coupled state of the electronically controlled clutch 10, the forward and aft torque distribution ratio is preset at a predefined torque split ratio as expressed by the front wheel:the rear wheel=50:50 (%). Note should be taken here that the aft drive torque split ratio is controlled in a step-less manner at a value ranging from 0 to 50% in accordance with the varying coupling state of the electronically controlled clutch 30.

In the illustrated embodiment, for example, a 4WD controller 44 has control modes involving a two-wheel drive (2WD) mode, a LOCK mode and an AUTO mode. In the 2WD mode, the 4WD controller 44 produces a control command to allow the electronically controlled clutch 30 to be released to render only the front wheels to be driven. In the LOCK mode, the 4WD controller 44 produced a control command to allow the electronically controlled clutch 30 to be locked in a fully coupled state to transfer drive torque to the rear wheels at the highest torque split ratio, providing a full, four-wheel driving property. In the AUTO mode, the forward and aft torque distribution ratio is automatically controlled in dependence on running conditions of the vehicle such as a difference in a rotational speed between the front and rear wheels, an accelerator opening and a vehicle speed.

The vehicle speed is discriminated in the 4WD controller on the basis of the rear wheel speed signals VRL and VRR that will be discussed later. The control modes are changed over by and selected with the use of a mode changeover switch 42 that selectively delivers a 2WD mode selection signal 42a, a LOCK mode selection signal 42b and an AUTO mode selection signal 42c.

The electronically controlled clutch 30 is controlled with a drive current signal 44a delivered from the 4WD controller 44.

The 4WD controller 44 includes a microcomputer which is input with mode selection signals 42a, 42b and 42c from the mode changeover switch 42, an engine speed signal 46a from an engine speed sensor 46, an accelerator opening signal 48a from an accelerator opening sensor 48, a left front-wheel speed signal VFL from a left front-wheel speed sensor 50, a right front-wheel speed signal VFR from a right front-wheel speed sensor 52, a left rear-wheel speed signal VRL from a left front-wheel speed sensor 54 and a right rear-wheel speed signal VRR from a right rear-wheel speed sensor 56.

The 4WD controller 44 is responsive to these input signals and supplies the drive current signal 44a to an electromagnetic solenoid 30a of the electronically controlled clutch 30 while supplying a display command signal 44b to an indicator 58 and supplying a warning light and alarm signal 44c to a warning light and alarm unit 60.

Figure 2:
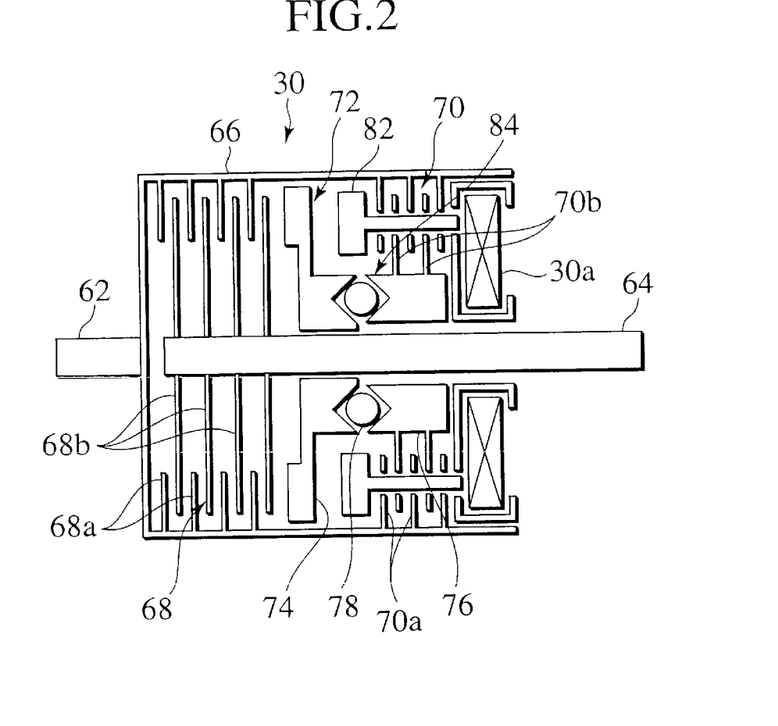
FIG. 2 is a schematic view of an electronically controlled clutch incorporated in the forward and aft torque distribution system shown in FIG. 1.
Figure 3:
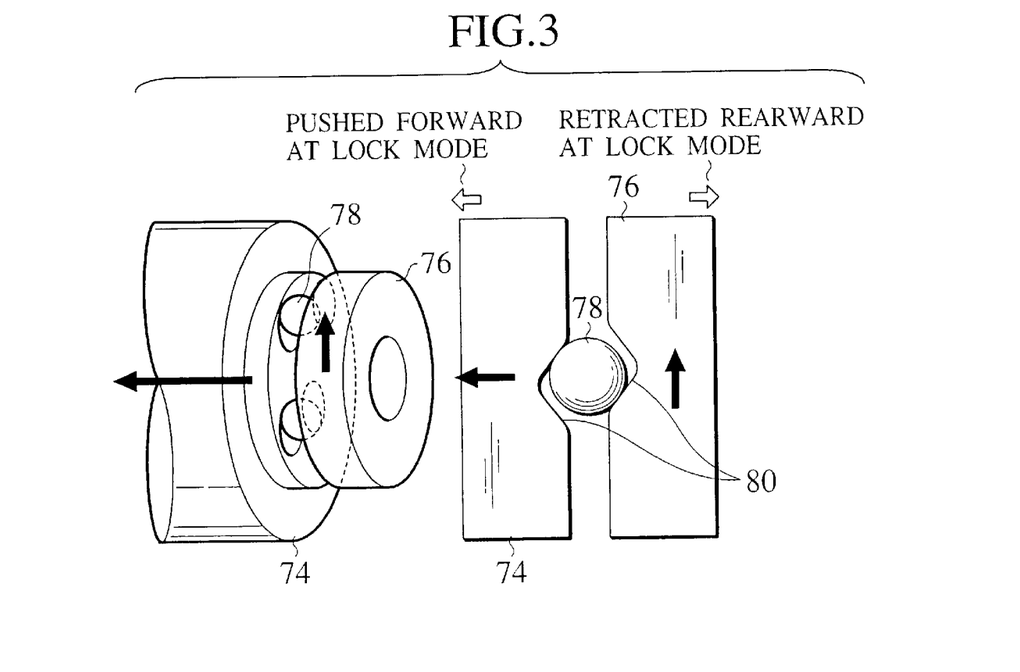
FIG. 3 is a perspective view illustrating an actuating cam mechanism of the electronically controlled clutch incorporated in the forward and aft torque distribution system shown in FIG. 11.

FIG. 2 is a schematic cross sectional view of the electronically controlled clutch 30, and FIG. 3 is a perspective view for illustrating the basic concept of operation of an actuating cam mechanism forming part of the electronically controlled clutch 30.

As shown in FIGS. 2 and 3, the electronically controlled clutch 30 includes a clutch input shaft 62 coupled to the propeller shaft 28, a clutch output shaft 64 coupled to the rear differential 32 and extending on a coaxial relationship with the clutch input shaft 62, a clutch housing 66 extending rearward from the clutch input shaft 62, a main clutch 68 disposed in the clutch housing 66 at a front portion thereof and having multiple outer clutch plates 68a fixed to the clutch housing 66 and multiple inner clutch plates 68b interposed between the adjacent outer clutch plates 68a and fixedly supported on a forward end of the clutch output shaft 64, a control clutch 70 disposed in the clutch housing 66 at a rear portion thereof and having multiple outer clutch plates 70a fixed to the clutch housing 66 and multiple inner clutch plates 70b interposed between the adjacent outer clutch plates 70b, and a clutch actuator 72 received in the clutch housing 66 between the main clutch 68 and the control clutch 70.

The clutch actuator 72 includes an axially moveable main cam 74 through which the clutch output shaft 64 axially extends, a control cam 76 disposed on the clutch output shaft 64 for sliding movement toward and way from the main cam 74 and carrying its outer periphery the inner clutch plates 70b of the control clutch 70, and a plurality of balls 78 located between opposing cam recesses 80 of the main cam 74 and the control cam 76, respectively.

With such a configuration, the actuating cam mechanism 84 is constructed of the main cam 74, the control cam 76, and the plurality of balls 78 disposed in the opposing cam recesses 80 as viewed in FIG. 3.

In FIG. 2, an armature 82 is operatively supported by the control cam 70 to actuate the same in forward or rearward directions. To this end, the electromagnetic solenoid 30a is fixedly supported in the clutch housing 66 at a rear end thereof and selectively moves the armature 82 in the forward or rearward directions to allow the control cam 76 to actuate the main clutch 68 in an released state, a variable coupling state and a fully coupled state in dependence on the magnitude of drive current signal 44a to be supplied to the electromagnetic solenoid 30a.

In operation, the electronically controlled clutch 30 controls operation of the main clutch 68 in a manner as described below. That is, during running of the 4WD vehicle, when the drive current signal 44a is supplied to the electromagnetic solenoid 30a from the 4WD controller 44, the electromagnetic solenoid 30a creates a magnetic flux, thereby retracting the armature 82 toward the control clutch 70. This causes the armature 82 to push the control clutch 70 such that it produces frictional torque. This frictional torque is then transferred to the control cam 76. When this occurs, the actuating cam mechanism 84 forcibly moves the main cam 74 in the forward direction via the opposing cam recesses 80 and the plurality of balls 78. In this instance, the main cam 74 pushes the main clutch 68, allowing the same to create coupling torque at a value proportional to the magnitude of the drive current signal applied to the electromagnetic solenoid 30a. The coupling torque created in the main clutch 68 is then transferred through the clutch output shaft 64 to the rear differential 32 as drive torque.

Now, the operation of the 4WD controller 44 is described below in detail with reference to FIG. 4.

LOCK Mode Control

Figure 4:
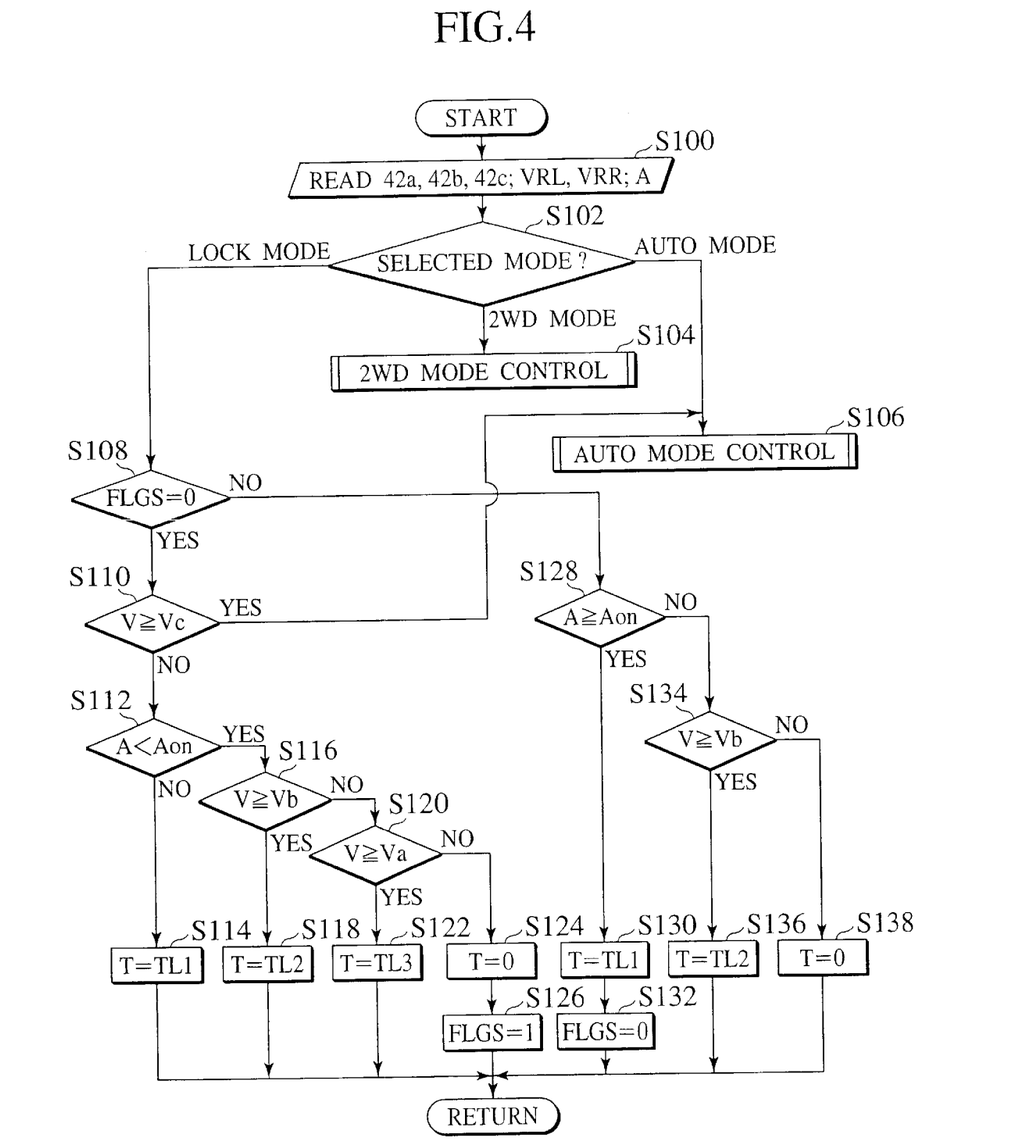
FIG. 4 is a flow diagram for illustrating the basic sequence of operations in a LOCK mode control process to be carried out in a 4WD controller incorporated in the forward and aft torque distribution system shown in FIG. 1.

FIG. 4 is a general flow diagram for illustrating the basic sequence of operations that are executed by the 4WD controller 44 in accordance with a program for executing the LOCK mode control.

At the start, i.e., when power is applied to the system, the operation starts. In the first execution of step S100, the microcomputer of the 4WD controller 44 reads in the LOCK mode selection signal 42b selected by the mode changeover switch 42, the rear left-wheel speed signal VRL from the rear left-wheel speed sensor 54, the rear right-wheel speed signal VRR from the rear right-wheel speed sensor 56, and the accelerator opening signal 48a from the accelerator pedal opening sensor 48.

In the next step S102, the microcomputer discriminates whether the control mode is in the LOCK mode, the 2WD mode or the AUTO mode, in response to the mode selection signals 42a, 42b and 42c delivered from the mode changeover switch 42. In the 2WD mode, the operation goes to step S104 wherein the 2WD mode control is executed for uncoupling the electronically controlled clutch 30. In the AUTO mode, further, the operation goes to step S106 wherein the AUTO mode control is executed to control the magnitude of coupling torque of the electronically controlled clutch 30 in dependence on the running conditions of the vehicle. In the LOCK mode, the operation goes to step S108, from which the operation further goes to succeeding steps S110 to S126.

In step S108, it is discriminated whether a running mode flag FLGS represents a state FLGS=0 or a state FLGS=1. When FLGS=0 (YES), the operation goes to step S110 for executing a vehicle's halt control and, when FLGS=1 (NO), the operation goes to step S128 for executing a vehicle's start-up control. Note should be taken here that the state FLGS=0 represents the vehicle's running state and the state FLGS=1 represents the vehicle's halt state.

In step S110, it is discriminated whether the vehicle speed exceeds a predefined vehicle speed Vc (i.e., for example, 20 Km/h). When V≧Vc, the operation goes to step S106 and when V<Vc, the operation goes to step S112. In step S110, the highest value is selected as the vehicle speed V from the rear left-wheel speed VRL and the rear right-wheel speed VRR (high select).

In step S112, it is discriminated whether the accelerator opening A is less than a predefined accelerator-ON discriminating opening Aon (i.e., for example, an opening degree of 5%; hereinafter referred as accelerator-ON discriminating opening Aon), that is, indicative of whether there exists a driver's halt intention (hereinafter an intention means a driver's intention). When the accelerator opening A is equal to or greater than the predefined accelerator-ON discriminating opening Aon, i.e., A≧Aon representing that there exists no intention to halt the vehicle, the operation goes to step S114. In contrast, when the accelerator opening A is less than the predefined accelerator-ON discriminating opening Aon, i.e., A<Aon representing that there exists the vehicle's halt intention, the operation goes to step S116.

In step S114, a control command is generated from the 4WD controller 44 to allow the electronically controlled clutch 30 to produce coupling torque T=TL1 (i.e., for example, 65 kg·m).

In step S116, it is discriminated whether the vehicle speed V is greater than a predefined vehicle speed Vb (i.e., for example, 10 km/h). When the vehicle speed V is equal to or greater than the predefined vehicle speed Vb, i.e., V≧Vb, the operation goes to step S118. In contrast, when the vehicle speed V is less than the predefined vehicle speed V, i.e., V<Vb, the operation goes to step S120.

In step S118, a control command is generated from the 4WD controller 44 to allow the electronically controlled clutch 30 to produce coupling torque T=TL2 (i.e., for example, 30 kg·m).

In step S120, it is discriminated whether the vehicle speed V is greater than a predefined vehicle's halt discriminative vehicle speed Va (i.e., for example, 2.75 km/h). When the vehicle speed V is equal to or greater than the predefined vehicle's halt discriminating vehicle speed Va, i.e., V≧Va, the operation goes to step S122. In contrast, when the vehicle speed V is less than the predefined vehicle's stop discriminating vehicle speed Va, i.e., V<Va, the operation goes to step S124.

In step S122, a control command is generated from the 4WD controller 44 to allow the electronically controlled clutch 30 to produce coupling torque T=TL3 (i.e., for example, 10 kg·m).

In step S124, a control command is generated from the 4WD controller 44 to allow the electronically controlled clutch 30 to produce coupling torque T=0 (i.e., an uncoupling state of the clutch 30).

In step S126, the running mode flag FLGS is reset from FLGS=0 to FLGS=1.

In step S128, it is discriminated whether the accelerator opening A is greater than the predefined accelerator-ON discriminating opening Aon (i.e., for example, the opening degree of 5%), that is, whether the accelerator pedal is depressed with a start-up intention. When the accelerator opening A is equal to or greater than the predefined accelerator-ON discriminating opening Aon, i.e., A≧Aon by which it is regarded that there exists the start-up intention, the operation goes to step S130. In contrast, when the accelerator opening A is less than the predefined accelerator-ON discriminating opening Aon, i.e., A<Aon by which it is regarded that there exists no start-up intention, the operation goes to step S134.

In step S130, a control command is generated from the 4WD controller 44 to allow the electronically controlled clutch 30 to produce the controllable driving torque T=TL1 (i.e., for example, 65 kg·m).

In step S132, the running mode flag FLGS is reset from FLGS=1 to FLGS=0.

In step S134, it is discriminated whether the vehicle speed V is greater than the predefined vehicle's creeping start-up discriminating speed Vb (i.e., for example, 10 km/h). When the vehicle speed V is equal to or greater than the predefined vehicle's creeping start-up discriminating speed Vb, i.e., V≧Vb, the operation goes to step S136. In contrast, when the vehicle speed V is less than the predefined vehicle's creeping start-up discriminative speed Vb, i.e., V<Vb, the operation goes to step S138.

In step S136, a control command is generated from the 4WD controller 44 to allow the electronically controlled clutch 30 to produce coupling torque T=TL2 (i.e., for example, 30 kg·m).

In step S138, a control command is generated from the 4WD controller 44 to allow the electronically controlled clutch 30 to produce coupling torque T=0 (i.e., the uncoupling state of the clutch 30).

Basic Vehicle's Halt Control

Under a circumstance wherein the LOCK mode is selected by the mode changeover switch 42 and the 4WD controller 44 allows the electronically controlled clutch 30 to be locked in the coupled state to provide coupling torque TL1, in the general flow diagram shown in FIG. 4, if the vehicle speed V is regarded to be less than the vehicle's halt discriminating vehicle speed Va, the operation goes to S124 to allow the electronically controlled clutch 30 to be released to remove coupling torque as expressed by the formula T=0.

Figure 5A:
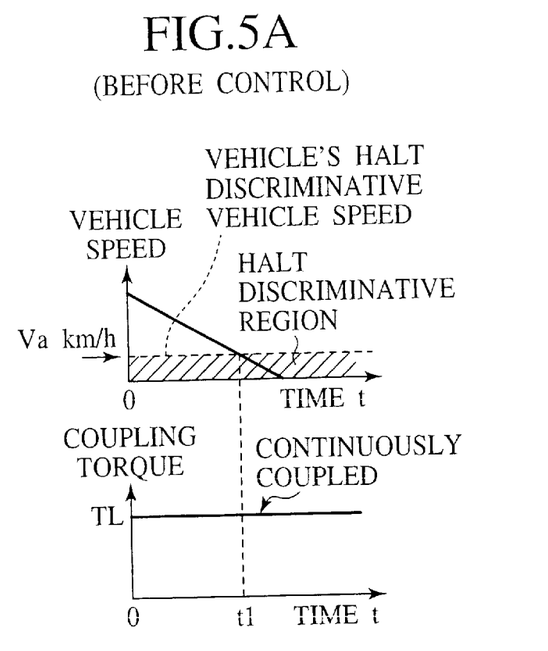
FIG. 5A is a timing diagram for comparison for illustrating a basic vehicle's halt control at a LOCK mode.

That is, during the running stage of the vehicle wherein forward driving or rearward driving are executed under a condition wherein the LOCK mode is selected and the vehicle is fully steered in rightward or rearward directions, if the electronically controlled clutch 30 remains unchanged in its coupled state at a time instant t1 with the coupling torque TL as viewed in FIG. 5A, a four-wheel drive unit (4W drive unit) incorporating the electronically controlled clutch 30 suffers from an undesired noisy sound owing to the 4W drive unit being replete with torque.

Figure 5B:
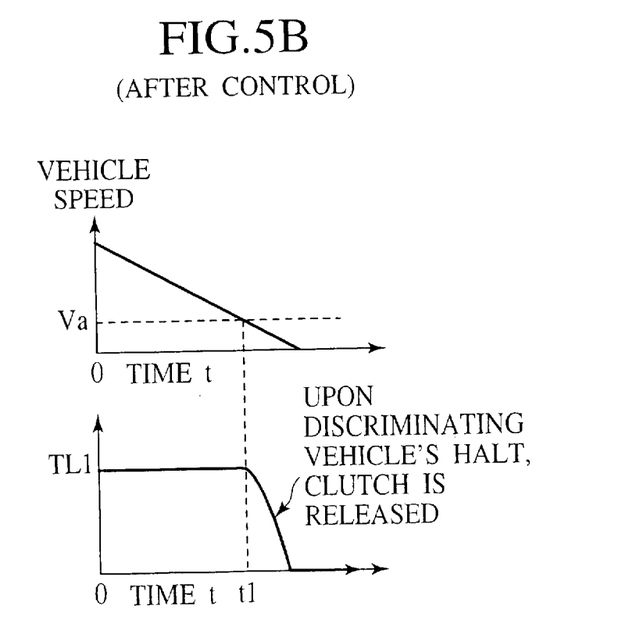
FIG. 5B is a timing diagram for illustrating a basic vehicle's halt control at the LOCK mode after control of the present embodiment.

On the contrary, the presence of a discriminating condition wherein the vehicle speed V becomes less than the vehicle's halt discriminating vehicle speed Va during a transition stage shifted from the running state to the vehicle's halt state in the LOCK mode renders the 4WD controller 44 to uncouple the electronically controlled clutch 30 at the time instant t1 as viewed in FIG. 5B. Since, in this instance, the electronically controlled clutch 30 is rendered inoperative at the time instant t1 in FIG. 5B after confirming the halt state of the vehicle, it is possible to avoid a delay in timing of uncoupling the clutch to prevent the generation of the noisy sound in a reliable fashion.

As a consequence, it is possible to enhance an improved operating performance in the LOCK mode owing to the clutch 30 remaining in the coupled state with coupling torque TL1 until the vehicle comes to a nearly halt state and to prevent the generation of the noisy sound, that would be otherwise caused at the timing when the LOCK mode is selected, by uncoupling the clutch 30 at a suitable timing.

Vehicle's Start-up Control With Accelerator Depression

In the event that when the LOCK mode is selected and the vehicle's halt control with the accelerator depression is executed to allow the electronically controlled clutch 30 to be released, the operation goes from step S108 to step S128, as viewed in FIG. 4. In step S128, when the accelerator opening A exceeds the accelerator-ON discriminating opening Aon, the operation goes to step S130 wherein a control command is generated from the 4WD controller 44 to allow the electronically controlled clutch 30 to produce coupling torque TL1.

Figure 6A:
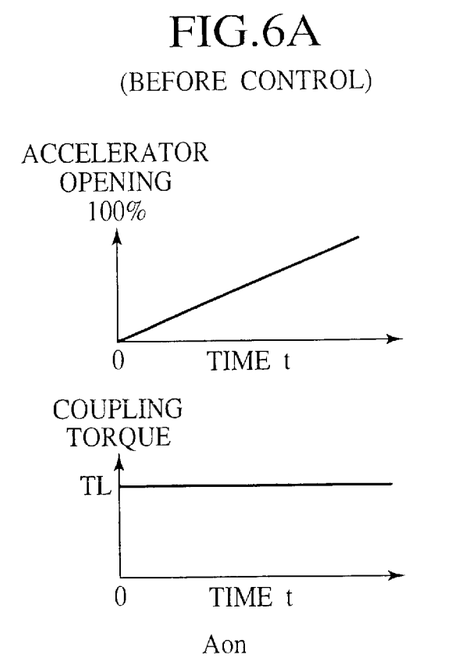
FIG. 6A is a timing diagram for comparison for illustrating a basic start-up control with accelerator's depression at the LOCK mode.

That is, in the event that the vehicle is shifted from the halt state to the start-up state, if the electronically controlled clutch 30 remains unchanged with coupling torque TL as viewed in FIG. 6A, the four-wheel drive unit encounters the noisy sound as described above.

During such a shifting stage from the vehicle's halt state to the vehicle's start-up state, if the electronically controlled clutch 30 is coupled in dependence on the vehicle speed condition as, for example, in the control at the vehicle's halt, the vehicle remains unchanged in the 2W drive state until the vehicle speed reaches the predefined vehicle speed, it is difficult to obtain a preferable start-up drivability by making the best use of a performance of the 4W drive unit inherent to the LOCK mode.

In contrast, the accelerator's opening condition, wherein the accelerator opening A exceeds the accelerator-ON discriminating opening Aon, represents a start-up intention of the vehicle. The 4WD controller 44 is arranged such that when the start-up intention of the vehicle is detected at a time instant t2 as viewed in FIG. 6B, the electronically controlled clutch 30 is coupled so as to sharply obtain coupling torque TL1 in the LOCK mode as viewed in FIG. 6B.

Figure 6B:
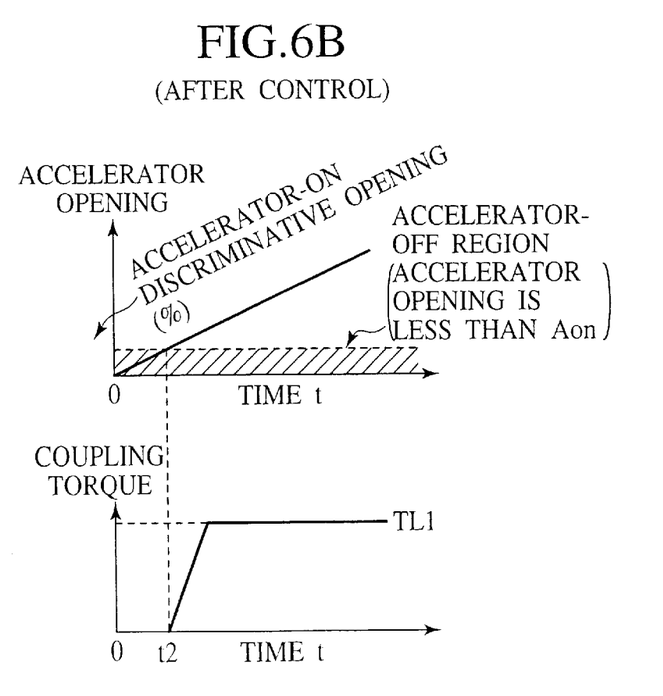
FIG. 6B is a timing diagram for illustrating a basic start-up control with accelerator's depression at the LOCK mode after control of the present embodiment.

Accordingly, by rendering the electronically controlled clutch 30 to be quickly coupled and to be returned to its LOCK mode when the start-up intention has been confirmed during transition stage from the vehicle's halt state to the vehicle's start-up state, it is possible to obtain a preferable start-up performance of the vehicle with the best use of the 4WD performance due to its LOCK mode.

Creeping Start-up Control

Initially, it is to be noted that the 4WD vehicle, to which the present invention is applied, is of the type wherein, as shown in FIG. 1, a drive train is constructed of the automatic power transmission 14 including the torque converter 14a.

When, in such an arrangement, the LOCK mode is selected, the electronically controlled clutch 30 is released in the vehicle's halt control process and the detected accelerator opening is less than the predefined accelerator-ON discriminating opening Aon, the operation goes from step S128 to step S134 wherein the electronically controlled clutch 30 remains unchanged in the released state until it is regarded that the vehicle speed exceeds the predefined vehicle speed Vb, representing the vehicle's creeping start-up, greater than the predefined vehicle's halt discriminating vehicle speed Va.

Figure 7A:
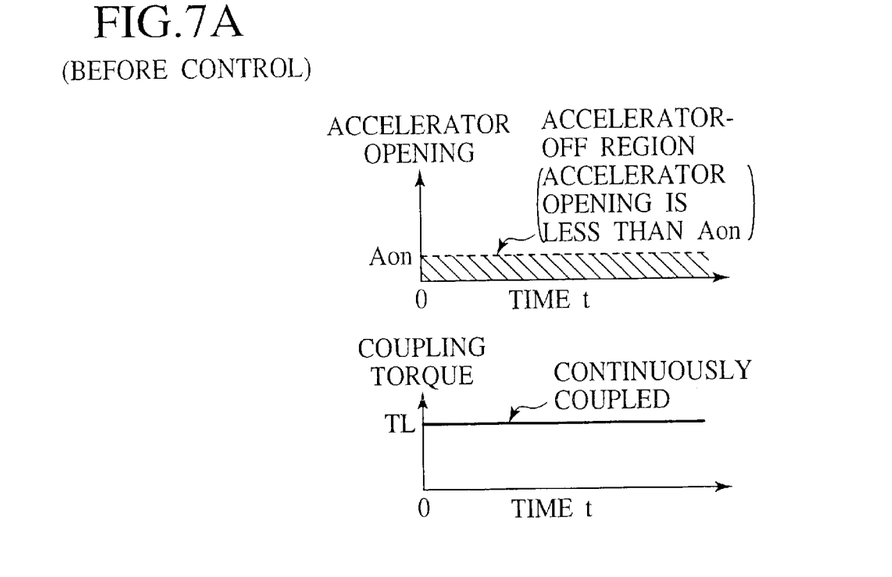
FIG. 7A is a timing diagram for comparison for illustrating a basic creeping start-up control.

That is, during a shift from the vehicle's halt state to the vehicle's creeping start-up state, if the electronically controlled clutch 30 remains unchanged in the coupled state with the coupling torque TL1 as viewed in FIG. 7A, the 4W drive unit encounters the noisy sound as described above.

Also, during the shift from the vehicle's stop state to the vehicle's creeping start-up state, if the electronically controlled clutch 30, which has been released, is quickly coupled when the vehicle speed V exceeds the vehicle's stop discriminating vehicle speed Va, the vehicle encounters an undesirable change in attitude due to twisting motion of the drive train caused by the clutch 30 replete with torque.

Figure 7B:
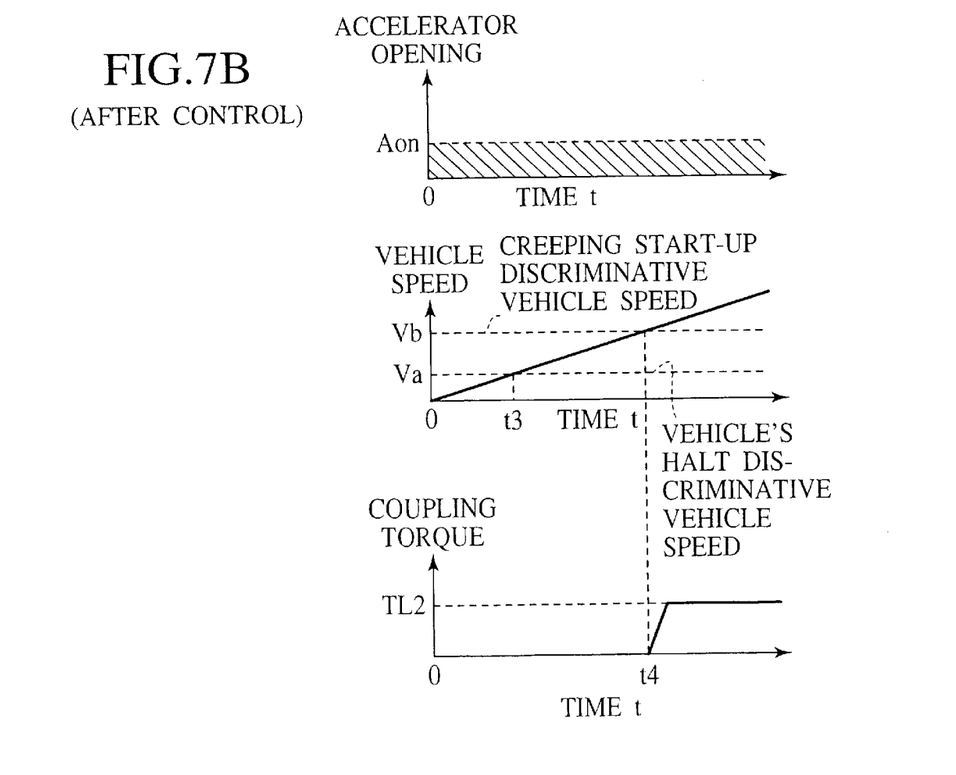
FIG. 7B is a timing diagram for illustrating a basic creeping start-up control at the LOCK mode after control of the present embodiment.

On the contrary, as viewed in FIG. 7B, the electronically controlled clutch 30 is arranged to remain unchanged in the uncoupling state until it is regarded that the vehicle speed V exceeds the predefined vehicle speed Vb, representing the vehicle's creeping start-up, which is greater than the vehicle's halt discriminative vehicle speed Va. That is, when the vehicle speed V is equal to or less than the vehicle's halt discriminative vehicle speed Va at a time instant t3 in FIG. 7B, and when the vehicle speed reaches the creeping start-up discriminative vehicle speed Vb, which is higher than the vehicle's halt discriminative vehicle speed Va, the controller 44 produces a control command to allow the electronically controlled clutch 30 to be sharply coupled at a time instant t4 as viewed in FIG. 7B.

Accordingly, in the creeping start-up step due to creeping torque produced by the torque converter, the electronically controlled clutch 30 remains released until the vehicle speed exceeds the predefined creeping start-up discriminative vehicle speed Vb, thereby preventing the variation in the vehicle's attitude to be caused by the clutch coupling.

Vehicle's Halt Control

In the vehicle's halt control in the LOCK mode, if the vehicle speed is less than the predefined vehicle speed Vc as seen in the general flow diagram in FIG. 4, the operation goes from step S110 to step S112 wherein, when the vehicle's halt intention (i.e., the halt intention of the driver of the vehicle) is confirmed in response to a releasing operation of the accelerator pedal, a control command is produced to allow the electronically controlled clutch 30 to be coupled with coupling torque T at varying magnitudes TL1, TL2 and TL3 that are lowered in a stepwise manner with a decrease in the vehicle speed. In step S120, when the vehicle speed V becomes less than the vehicle's halt discriminative vehicle speed Va, the operation goes to step S124 to allow the electronically controlled clutch 30 to be released.

Figure 8A:
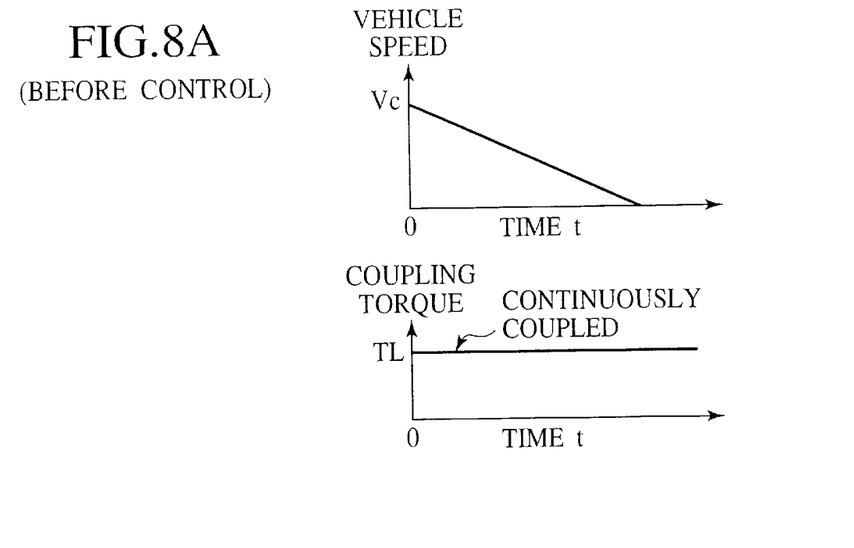
FIG. 8A is a timing diagram for comparison for illustrating a detailed vehicle's halt control at the LOCK mode.

That is, in the event that the vehicle is running forward or rearward under a condition wherein the LOCK mode is selected and the vehicle is fully steered rightward or leftward, if the electronically controlled clutch 30 remains in the coupled state with coupling torque TL as viewed in FIG. 8A, the 4WD unit, in which the electronically controlled clutch 30 is incorporated, encounters the noisy sound owing to the 4WD unit replete with torque.

To address this issue, if the electronically controlled clutch 30 is released quickly after it has been regarded that the vehicle is brought into the nearly halt condition, although the noisy sound is avoided, another problem is encountered in that an uncoupling operation, which renders coupling torque to be reduced to zero from the greater coupling torque at a stretch, allows the twisting torque to be rapidly lost in the drive train. This causes the vehicle to shake owing to a reactive twisting force.

Figure 8B:
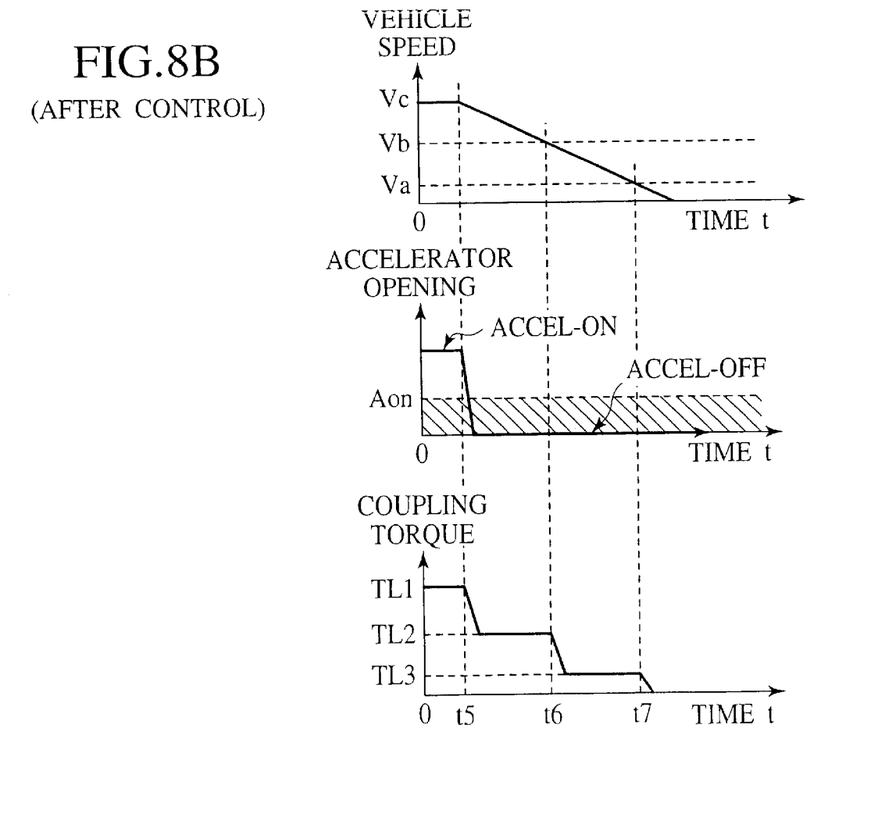
FIG. 8B is a timing diagram for illustrating a detailed vehicle's halt control at the LOCK mode after control of the present embodiment.

In contrast, when the vehicle's halt intention is confirmed in response to the releasing operation of the accelerator pedal at a time instant t5 as viewed in FIG. 8B, since the vehicle speed is preliminarily decreased from the greater vehicle speed Vc to the lower vehicle speed Va via the time instants t6 and t7 and the coupling torque T is lowered in a sequence TL1→TL2→TL3 in a stepwise manner at the time instants t5, t6 and t7, it is possible for coupling torque to be varied in a small range during the uncoupling operation of the electronically controlled clutch 30.

As a consequence, even when the vehicle is shifted from the running state to the halt condition in the LOCK mode, the electronically controlled clutch 30 can be released while avoiding the shaking of the vehicle.

Start-up and Running Process At LOCK MODE

Figure 9:
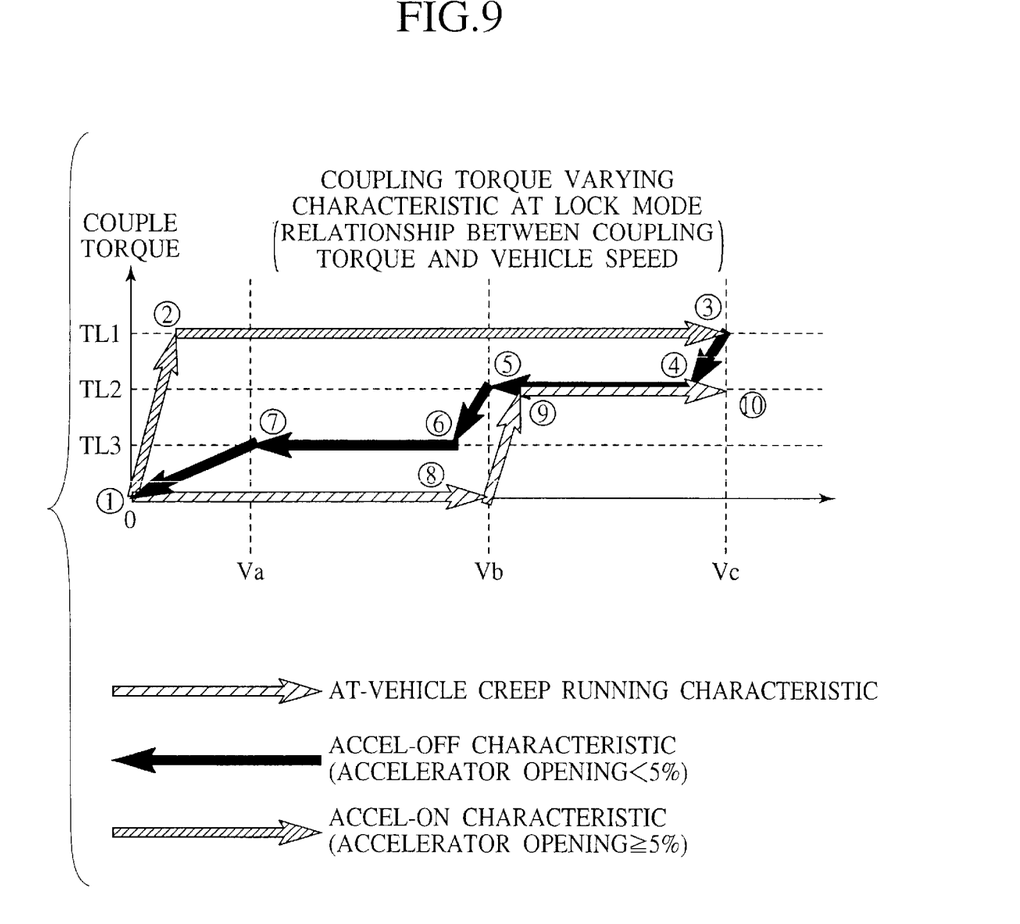
FIG. 9 is a schematic view for illustrating a coupling torque varying characteristic obtained at the LOCK mode according to the present embodiment.

The coupling torque varying characteristic of the electronically control clutch 30 is described below in detail with reference to FIG. 9 in terms of a start-up process responsive to the accelerator's depression (i.e., an accelerator-ON) and a creeping start-up process.

1. Start-up process with accelerator-ON (i.e., beyond an accelerator opening of 5%)

1) Vehicle's halt (1)→start-up with the accelerator-ON (between (1)-(2))→continued running with the accelerator-ON (between (2)-(3))→the vehicle speed in the range between Vb and Vc→AUTO mode at the vehicle speed Vc, provided that the mode indicator remains in the LOCK mode (after (3)).

2) Vehicle's halt (1)→start-up with accelerator-ON (between (1)-(2))→continued running with accelerator-ON (between (2)-(3))→accelerator-OFF at the vehicle speed less than Vb to Vc ((3)-(4))→running with the accelerator-FF at the vehicle speed between Vb and Vc→running with the accelerator-OFF at the vehicle speed less than Va to Vb→vehicle's halt at the vehicle speed 0 to Va ((7)-(1)).

3) Vehicle's halt (1)→start-up with the accelerator-ON ((1)-(2))→running with the accelerator-ON at the vehicle speed less than Va to Vb→accelerator-OFF at the vehicle speed less than the vehicle speed Va to Vb (among (5)→(6)→(7))→vehicle's halt at the vehicle speed 0 to Va ((7)-(1)).

2. Creeping start-up process with accelerator-OFF (i.e., less than the accelerator opening of 5%)

1) Vehicle's halt (1)→creeping start-up with the accelerator-OFF (between ((1)-(8))→accelerator-OFF at the vehicle speed less than Va to Vb (between ((1)-(8))→accelerator-OFF at the vehicle speed Vb to Vc (among (8)→(9)→(10))→AUTO mode at the vehicle speed greater than Vc with the accelerator-OFF (provided that the mode indicator remains in the LOCK mode).

In the above processes, when the vehicle is fully steered during running in the LOCK mode on a dry road surface, the vehicle is caused to stall with the accelerator-ON due to a tight corner-braking effect. With such an accelerator-OFF condition, although the vehicle stalls once due to the tight corner-braking effect, the 4WD controller 44 discriminates the vehicle's halt (i.e. representing that the rotational speed of the drive wheel remaining outside a non-driven wheel becomes less than the predefined vehicle's halt discrimina-tive vehicle speed Va), thereby releasing drive torque by uncoupling the clutch 30. This leads to the 2W drive state in the drive train to enable the vehicle to be fully steered while enabling start-up of the vehicle at the creeping condition.

2) Vehicle's halt (1)→creeping start-up with the accelerator-OFF (between (1)-(8))→accelerator-OFF at the vehicle speed less than Va to Vb (between (1)-(8))→accelerator-ON at the vehicle speed Va to Vb (jumping between (2)-(3))→accelerator-OFF at the vehicle speed less than Va to Vb (among (5)→(6)→(7))→vehicle's halt at the vehicle speed 0 to Va (between (7)-(1)).

Alternative Embodiments

In the illustrated embodiment discussed above, while the forward and aft torque distribution control system has been exemplarily illustrated as applied to the 4WD vehicle of the front wheel drive type, it should be noted that the principal concept of the present invention may also be applied to a forward and aft torque distribution system of the 4WD vehicle of the rear wheel drive type or to a torque distribution system which incorporates a forward drive path, a rearward drive path and forward and rearward electronically controlled clutches associated with the forward and rearward drive paths, respectively, for controlling torque distribution of the front and rear wheels.

In the illustrated embodiment, while the electronically controlled clutch has been exemplarily shown and described as including a control clutch adapted to be actuated with the electromagnetic solenoid, and the main clutch adapted to be coupled with the actuating cam mechanism, the electronically controlled clutch may also be of the type which employs the control clutch composed of multi clutch plates adapted to be coupled with hydraulic control pressure or the control clutch composed of other actuating cam mechanism than the actuating cam mechanism composed of the cam recesses and the balls.

In the illustrated embodiment, while the forward and aft torque distribution system has been shown and described as applied to the example wherein the coupling torque of the clutch is lowered in the stepwise manner in dependence on the decrease in the vehicle speed when it is regarded that, when the LOCK mode is selected and the vehicle speed is less than the predefined vehicle speed Vc, the vehicle speed represents the vehicle's halt intention, the magnitude of coupling torque may be lowered in the non-stepwise manner with the decrease in the vehicle speed.

In the illustrated embodiment, while the forward and aft torque distribution system has been shown and described as applied to the example wherein the vehicle's halt intention is discriminated from the accelerator's OFF operation, the vehicle's halt intention may be discriminated from the braking operation or the decrease in the vehicle speed or the combination of one or plural of these factors.

The system and the method for drive torque distribution control of the present invention provides numerous advantages over the related art practices and which are summarized as below.

(A) In the event that the vehicle speed V is less than the vehicle's halt discriminative vehicle speed Va in the LOCK mode, the electronically controlled clutch 30 is controlled such that it is released, allowing the electronically controlled clutch 30 to remain in the coupled state with coupling torque TL1 until the vehicle comes to the nearly halt state for thereby enhancing the performance of the LOCK mode. Also, it is possible for the 4W drive unit not to produce the noisy sound, that would be otherwise caused during selection of the LOCK mode, by uncoupling the electronically controlled clutch at the suitable timing. More particularly, in the event that when the LOCK mode is selected by the mode changeover switch to allow the electronically controlled clutch 30 to be locked in the coupled state, if the vehicle speed detected by the vehicle speed sensor is discriminated to be less than the vehicle's halt discriminative vehicle speed in the vehicle's halt control process, the control is executed to uncouple the electronically controlled clutch. That is, during the running condition of the vehicle in the forward or rearward directions under the circumstance wherein the LOCK mode is selected and the vehicle is fully steered rightward or leftward, if the electronically controlled clutch remains in the coupled state, the 4WD unit encounters the noisy sound that would be otherwise caused in the electronically controlled clutch which is replete with torque. This noisy sound does not disappear even when the electronically controlled clutch is released on the basis of the discrimination of the vehicle's halt unless the electronically controlled clutch is released before the vehicle is shifted to forward running or rearward running. On the contrary, when it is regarded that when the vehicle is shifted from the running state to the halt condition in the LOCK mode, the vehicle speed becomes less than the vehicle's halt discrimination vehicle speed indicative of the nearly halt state of vehicle, the electronically controlled clutch is controlled to be released, thereby preventing the noisy sound from being produced in a reliable manner without causing a time delay, in the uncoupling timing of the clutch, that would otherwise occur when the clutch is released after confirming the halt state of the vehicle. It will thus be noted that by allowing the clutch to remain in the coupled state until the vehicle comes to the nearly halt state, it is possible to obtain the improved performance of the LOCK mode control process and to prevent the noisy sound from being produced in the selected LOCK mode owing to the suitable uncoupling timing.

(B) In the event that when electronically controlled clutch 30 is released by the vehicle's halt control process in the selected LOCK mode, if the accelerator opening A exceeds the accelerator-ON discriminative opening Aon, the control command is produced to allow the electronically controlled clutch to be coupled with coupling torque TL1 such that when the vehicle is shifted from the halt state to the running state, the 4WD controller 44 allows the electronically controlled clutch to return to the clutch coupling state promptly after the vehicle's halt intention has been confirmed, thereby enhancing the desired start-up operating performance with the best use of the 4W drive operating performance in the LOCK mode. More specifically, when the accelerator opening exceeds the accelerator-ON discriminative opening in the accelerator-ON start-up control process under the circumstances wherein when the LOCK mode is selected, the electronically controlled clutch is released due to the vehicle's halt control process, the control command is produced such that the electronically controlled clutch is coupled to produce coupling torque. That is, during the shift from the halt state to the running state of the vehicle, if for example the electronically controlled clutch is brought into the coupled condition in dependence on the vehicle speed condition as in the vehicle's halt control process, the vehicle remains in the 2WD state during running until the vehicle speed exceeds the predefined vehicle speed, with a resultant difficulty in obtaining the desired start-up driving performance making the best use of the four-wheel drive performance in the LOCK mode. In contrast, the forward and aft drive torque distribution control method and system make it possible for the 4WD controller to return to the LOCK mode to render the electronically controlled clutch to be coupled to meet the driver's will for the start-up of the vehicle promptly after the vehicle's start-up intention has been confirmed during the shift from the halt state to the start-up state provided that the accelerator opening exceeds the accelerator-ON discriminative opening, thereby obtaining the desired start-up drivability with the best use of the 4WD operating performance in the LOCK mode.

(C) Since the electronically controlled clutch 30 remains in the released state until the vehicle speed V exceeds the predefined vehicle speed Vb indicative of the creeping start-up of the vehicle when the LOCK mode is selected and the accelerator opening A remains less than the accelerator-ON discriminative opening, it is possible to prevent the variation in the vehicle's attitude due to its jolt motion that would otherwise occur in the drive train owing to the clutch coupling during the creeping start-up. In particular, the 4WD vehicle includes the drive train composed of the automatic power transmission equipped with the torque converter. In such a drive train, when the electronically controlled clutch is released by the vehicle's halt control process in the selected LOCK mode and the detected accelerator opening remains less than the accelerator-ON discriminative opening, the electronically controlled clutch remains released until the detected vehicle speed exceeds the creeping start-up discriminative vehicle speed greater than the vehicle's halt discriminative vehicle speed. Accordingly, during the creeping start-up of the vehicle due to the creeping torque of the torque converter, the electronically controlled clutch remains released until the vehicle speed exceeds the creeping start-up discriminative vehicle speed, it is possible for the vehicle's attitude from being detrimentally varied owing to the jolt motion caused by the clutch coupling even when the vehicle is fully steered.

(D) When the vehicle speed V remains less than the predefined vehicle speed Vc and the vehicle's halt intention is discriminated in the selected LOCK mode, since the control command is produced to lower the magnitude of coupling torque of the electronically controlled clutch 30 in the stepwise manner in dependence on the decrease in the vehicle speed and the electronically controlled clutch is released when the vehicle speed becomes less than the vehicle's halt discriminative vehicle speed Va, it is possible for the electronically controlled clutch 30 to be released while preventing the vehicle's jolt motion during the shift from the running mode to the halt mode in the LOCK mode. That is, although the noisy sound disappears by uncoupling the electronically controlled clutch promptly after it has been discriminated that the vehicle comes to the nearly halt condition, the uncoupling operation of the electronically controlled clutch from its greater coupling torque to the zero torque at a stretch causes the twisting torque to be rapidly removed from the drive train to produce the reactive force, thereby causing the vehicle to suffer from the jolt motion. In contrast, the discrimination of the driver's will to halt the vehicle responsive to the releasing operation of the accelerator pedal or the braking operation allows the electronically controlled clutch to be lowered in the magnitude of coupling torque in the stepwise or non-stepwise manners with the decrease in the vehicle speed ranging from the predefined greater vehicle speed to the low vehicle speed. This may prove beneficial to reduce the range in variation of the coupling torque in the final uncoupling stage of the electronically controlled clutch. Thus, when the vehicle is shifted from the running state to the halt state in the LOCK mode, the electronically controlled clutch may be released without causing the vehicle to suffer from the jolt motion.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A forward and aft torque distribution control system for a four-wheel drive vehicle comprising:
   an electronically controlled clutch controlling forward and aft torque distribution to be transferred to front and rear wheels;
   a mode changeover switch selectively producing mode selection signals comprising at least a LOCK mode selection signal and an AUTO mode selection signal;
   a vehicle speed sensor detecting a vehicle speed and producing a vehicle speed signal; and
   a controller responsive to the mode selection signals and the vehicle speed signal and controlling the electronically controlled clutch to control forward and aft torque distribution to be split to front and rear wheels,
   wherein the controller has control modes involving at least a LOCK mode to allow the electronically controlled clutch to be locked in a coupled state, and an AUTO mode to allow the electronically controlled clutch to be automatically controlled so as to alter forward and aft torque distribution depending on running conditions of a four-wheel drive vehicle,
   and wherein after the vehicle speed becomes less than a speed indicative of a vehicle's halt state and before the vehicle speed reaches to zero during the LOCK mode, the controller allows the electronically controlled clutch to be released so as to cause coupling torque of the electronically controlled clutch to become zero.

2. A forward and aft torque distribution control system according to claim 1, further comprising an accelerator opening sensor detecting an accelerator opening to produce an accelerator opening signal,
   wherein when the LOCK mode is selected and the electronically controlled clutch is released by the controller, the controller is operative during start-up of the vehicle to produce a control command to allow the electronically controlled clutch to be coupled to provide coupling torque in response to the accelerator opening equal to or exceeding an accelerator-ON opening indicative that the vehicle starts moving.

3. A forward and aft torque distribution control system according to claim 2, wherein the four-wheel drive vehicle includes a drive train comprising an automatic power transmission having a torque converter, and
   wherein when the LOCK mode is selected and the electronically controlled clutch is released by the controller while the accelerator opening is less than the accelerator-ON opening, the controller is operative during a creeping start-up of the vehicle to produce a control command to allow the electronically controlled clutch to be coupled for the creeping start-up of the vehicle in case the vehicle speed is equal to or exceeds a creeping start-up speed of the vehicle, and the controller is operative to produce a control command to allow the electronically controlled clutch to remain released in case the vehicle speed is less than the creeping start-up speed of the vehicle.

4. A forward and aft torque distribution control system according to claim 3, wherein the creeping start-up speed is greater than the speed indicative of the vehicle's halt state.

5. A forward and aft torque distribution control system according to claim 1, further comprising an accelerator opening sensor detecting an accelerator opening to produce an accelerator opening signal,
   wherein when the LOCK mode is selected, the vehicle speed is less than a predefined vehicle speed and the accelerator opening is less than an accelerator-ON opening indicative that the four-wheel drive vehicle starts moving, the controller is operative to produce a control command to allow the electronically controlled clutch to gradually lower the coupling torque with a decrease in the vehicle speed, and after the vehicle speed becomes less than the speed indicative of the vehicle's halt state, the controller allows the electronically controlled clutch to be released so as to cause the coupling torque to become zero.

6. A forward and aft torque distribution control system according to claim 1, wherein the controller has a 2WD control mode to allow the electronically controlled clutch to be released.

7. A forward and aft torque distribution control system according to claim 1, wherein the four-wheel drive vehicle includes an engine to produce a power output, an automatic power transmission coupled to the engine and a torque-split transfer coupled to the automatic power transmission to deliver drive torque to the front and rear wheels,
   wherein the electronically controlled clutch is coupled between the torque-split transfer and the rear wheels and includes an input shaft coupled to the torque-split transfer, an output shaft coupled to the rear wheels, a main clutch located between the input and output shafts to selectively assume a coupled state and a released state, an actuating mechanism allowing the main clutch to be coupled or released, and an electromagnetic coil associated with the actuating mechanism and electrically connected to the controller to receive a drive current signal therefrom.

8. A forward and aft torque distribution control system for a four-wheel drive vehicle comprising:
   an electronically controlled clutch controlling forward and aft torque distribution to be transferred to front and rear wheels;
   mode changeover means for selectively producing at least a LOCK mode selection signal and an AUTO mode selection signal;
   vehicle speed sensor means for detecting a vehicle speed and producing a vehicle speed signal; and
   4WD control means for controlling the electronically controlled clutch to control forward and aft torque distribution to be split to front and rear wheels, responsive to the mode selection signals and the vehicle speed signal,
   wherein the 4WD control means has control modes involving at least a LOCK mode to allow the electronically controlled clutch to be locked in a coupled state, and an AUTO mode to allow the electronically controlled clutch to be automatically controlled so as to alter forward and aft torque distribution depending on running conditions of a four-wheel drive vehicle, and
   wherein after the vehicle speed becomes less than a speed indicative of a vehicle's halt state and before the vehicle speed reaches to zero during the LOCK mode, the 4WD control means allows the electronically controlled clutch to be released so as to cause coupling torque of the electronically controlled clutch to become zero.

9. A method of controlling forward and aft torque distribution control for a four-wheel drive vehicle, comprising:

preparing an electronically controlled clutch to control drive torque to be transferred to front and rear wheels;

preparing a controller having control modes involving at least a LOCK mode to allow an electronically controlled clutch to be locked in a coupled state, and an AUTO mode to allow the electronically controlled clutch to be automatically controlled so as to alter forward and aft torque distribution depending on running conditions of a four-wheel drive vehicle;

selectively producing mode selection signals involving at least a LOCK mode selection signal and an AUTO mode selection signal;

detecting a vehicle speed and producing a vehicle speed signal; and controlling the electronically controlled clutch with the controller to control forward and aft torque distribution to be split to front and rear wheels in response to the mode selection signals and the vehicle speed signal such that after the vehicle speed becomes less than a speed indicative of a vehicle's halt state and before the vehicle speed reaches zero during the LOCK mode, the controller allows the electronically controlled clutch to be released so as to cause coupling torque of the electronically controlled clutch to become zero.

* * * * *